US006764085B1

(12) United States Patent  
Anderson

(10) Patent No.: US 6,764,085 B1  
(45) Date of Patent: Jul. 20, 2004

(54) NON-CONTACT SPRING GUIDE

(75) Inventor: Brian K. Anderson, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 09/635,579

(22) Filed: Aug. 9, 2000

(51) Int. Cl.[7] .................................................. B60G 3/04
(52) U.S. Cl. ........................ 280/124.134; 280/124.135; 280/124.136; 280/124.141; 280/124.145; 280/124.151; 280/124.179
(58) Field of Search ....................... 280/124.134, 124.1, 280/124.109, 124.125, 124.127, 124.135, 124.136, 124.139, 124.137, 124.141, 124.142, 124.145, 124.146, 124.147, 124.151, 124.154, 124.155, 124.162, 124.164, 124.179, FOR 121, FOR 124, FOR 158, FOR 181

(56) References Cited

U.S. PATENT DOCUMENTS

| 2,075,585 | A | | 3/1937 | Martin |
| 2,150,073 | A | * | 3/1939 | Malott |
| 3,155,382 | A | * | 11/1964 | Shakespear .......... 280/124.142 |
| 4,190,378 | A | | 2/1980 | Stecklein |
| 4,274,655 | A | * | 6/1981 | Lederman ............ 280/124.155 |
| 4,786,075 | A | | 11/1988 | Takahashi |
| 4,826,203 | A | | 5/1989 | Kijima et al. |
| 5,312,199 | A | | 5/1994 | Smith, Jr. |
| 5,538,274 | A | | 7/1996 | Schmitz et al. |
| 5,868,410 | A | * | 2/1999 | Kawabe et al. ....... 280/124.134 |
| 6,105,984 | A | | 8/2000 | Schmitz et al. |
| 6,516,914 | B1 | * | 2/2003 | Andersen et al. .......... 180/312 |

FOREIGN PATENT DOCUMENTS

| DE | 1 806 332 | | 5/1970 |
| DE | 2354776 | * | 5/1974 ........ 280/FOR 181 |
| EP | 0 287 278 B1 | | 10/1988 |
| EP | 0 410 675 B1 | | 12/1993 |
| EP | 1 164 074 A2 | | 12/2001 |
| EP | 0 706 904 B1 | | 1/2002 |
| GB | 218114 | | 7/1924 |
| GB | 429596 | | 5/1935 |
| GB | 947853 | | 1/1964 |
| GB | 1 286 229 | | 8/1972 |
| GB | 2 147 553 A | | 5/1985 |
| GB | 2 230 237 A | | 10/1990 |
| GB | 2 277 304 A | | 10/1994 |
| GB | 2 365 829 A | | 2/2002 |
| JP | 2001-140964 | | 5/2001 |

OTHER PUBLICATIONS

Oshkosh Brochur, Oshkosh HEMETT SEP, Heavy Expanded Mobility Tactical Truck System Enhcancement Program, Oshkosh Truck Corporation, HMT–S5054294, publicly available Jun. 20–25, 1994, 4 pages.

"Prototype Independent Suspension, " Automotove Engineer Magazine, Aug./Sep. 1992 edition, p. 82, Institution of Mechanical Engineer in the U.K.

"High Performance Vehicles Driven Solo/Tandem Axle System," "High Performance Vehicles Driven Solo Axle System," Rockwell International advertising leaflets (2) published in 1994, 2 pages.

Rockwell Suspension Layout Drawing No. 94.A1.352 dated Mar. 15, 1994, 1 page.

(List continued on next page.)

*Primary Examiner*—Eric Culbreth  
(74) *Attorney, Agent, or Firm*—Foley & Lardner LLP

(57) ABSTRACT

A spring guide for maintaining the alignment of a vehicle's suspension coil spring and for reducing the tendency for such springs to buckle. The spring guide is a smooth tube which fits into and slides in an elastomeric bushing mounted to the top bearing plate of a coil spring assembly. The lower end of the spring guide is threaded into the pivoting support for the lower end of the spring. The guide ensures that the ends of the spring are aligned with respect to one another.

28 Claims, 14 Drawing Sheets

OTHER PUBLICATIONS

Hummer Brochure, "Hummer by AM General, World Leader in Military Trucks," Jul. 1983, 4 pages.

Photography of Hummer suspension, 1 page.

Drawing of suspension system used on Airport Crash Fire Rescue Truck in use since 1991.

Photographs (3) of part of suspension system illustrating spring rocker plate assembly, 3 pages.

* cited by examiner

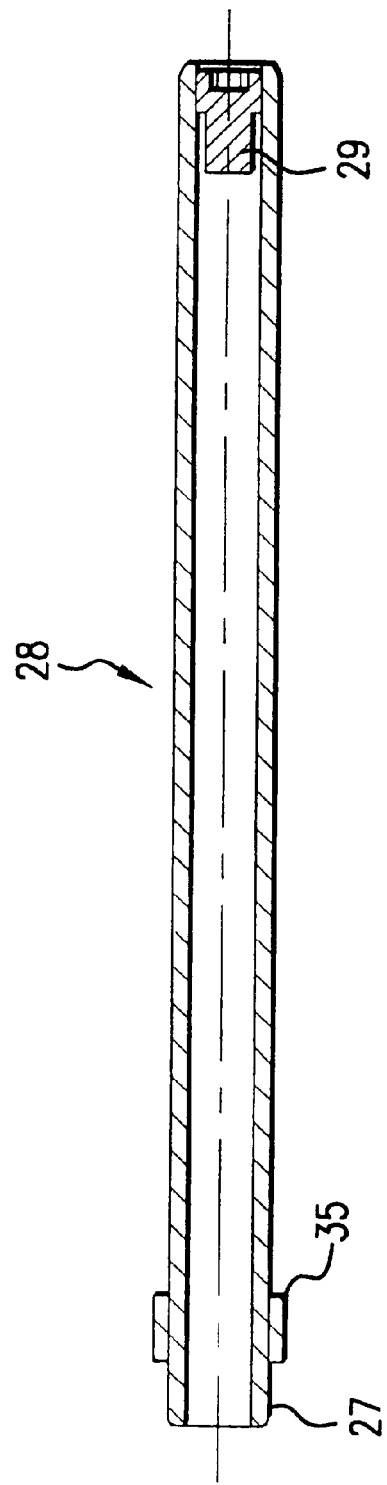

NON-CONTACT SPRING GUIDE

BACKGROUND AND SUMMARY OF THE INVENTION

The present invention relates to large vehicles having independent suspensions, such as those which are typically used in military applications and in large municipal vehicles, such as fire trucks. In particular, the invention relates to a frame and independent suspension assembly which allows a vehicle to have better stability by lowering the center of gravity, and better visibility because of the lower drivetrain and lower hoodline.

Military and other emergency vehicles must be designed to extremely demanding specifications. The vehicles must be capable of driving over or through obstacles which only a tactical or emergency driver would attempt. The vehicles must be able to endure corrosive, partially submerged and frequently dirty environments, such as standing water, chemicals or deep mud.

In addition, it is desirable to for such vehicles to provide maximum forward visibility for the operator and maximum load carrying capacities. One step which has been taken in the design of heavy duty vehicles has been to utilize C-shaped channels as the main frame members. The use of widely-spaced beams provides a space where of various engine, transmission and other essential components can be mounted. Making more space available along the center line of the vehicle frame allows heavy components to be more effective mounted at lower elevation which, in turn, lowers the vehicle's center of gravity. Vehicles with low centers of gravity have improved stability and provide greater visibility to the operator of the vehicle. A lower center of gravity in a vehicle provides improved resistance to overturning as the vehicle traverses rough terrain or maneuvers around obstacles at high rates of speed. The improved visibility which results from a lowering of a vehicle's drive train and hoodline allows for safer operation of the vehicle. While the present invention has particular application in the context of frame members which are C-shaped, the invention may be used with frame members having other shapes, such at tubular shapes (rounded and rectangular) and other structurally advantageous shapes.

The present invention provides a vehicle with a lower center of gravity, both with respect to vehicle components and with respect to cargo areas. These and other advantages are accomplished by using weldments which attach to and reach under the main frame members. The weldments include opposing side plates. Each side plate has two buttress-type end plates which support a main side plate member. The main side plate members are comprised of four generally rectilineraly oriented and integrally formed plates. Small buttress plates are used to define pockets for suspension components such as a suspension spring and shock absorber. The weldments may include a pocket for a sway bar bushing and an opening which allows a sway bar to pass through the pair of weldments. A non-contact spring guide may be mounted inside a suspension coil spring. The spring and spring guide are mounted between a lower control arm and a bearing plate carried by the front weldment of the present invention. The spring guide cooperates with a spring guide bushing, which is also carried by the bearing plate and which extends into the interior of the coil spring.

Other features and advantages of the present invention will be better understood upon a reading of the following specification, read together with the accompanying drawings, wherein:

BRIEF DESCRIPTION OF THE DRAWINGS

FIG. 15 is a longitudinal cross-section through a spring guide made in accordance with the present invention.

DETAILED DESCRIPTION OF THE INVENTION

Figure 1:
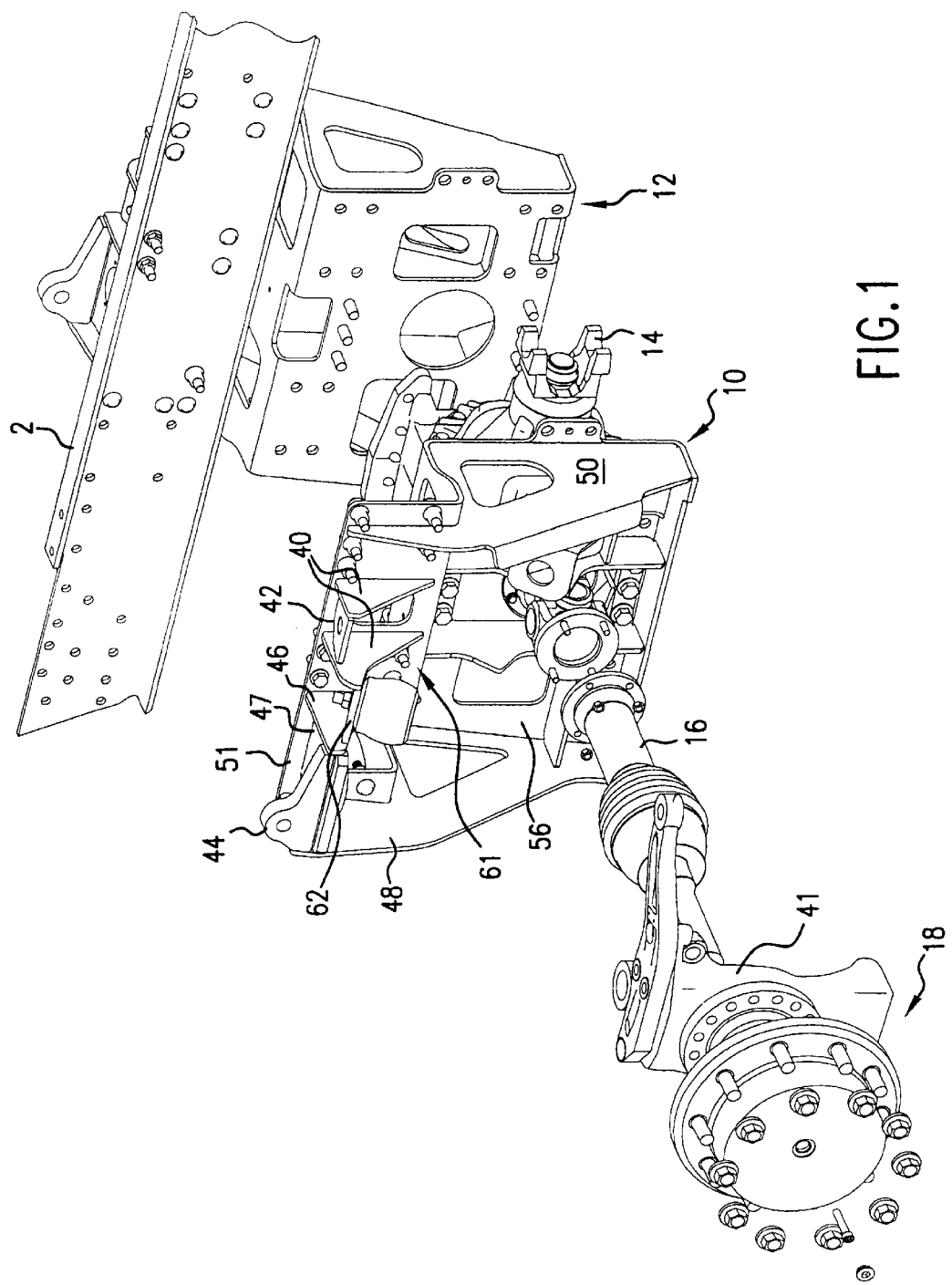
FIG. 1 is a perspective view of a pair of front weldments and portions of a front axle constructed in accordance with the present invention.

FIG. 1 shows the front portion of a vehicle and its suspension support in relation to a frame rail 2 of a vehicle. A left-hand or first side plate 10 is mounted beneath a left-hand frame rail (not shown), and a right-hand or second side plate 12 is mounted beneath a right-hand frame rail 2. Several bolts are used to connect each of the side plates 10 and 12 to its respective frame rail. A differential 15 with a differential drive connection 14 is connected to each of the side plates 10 and 12. The side plates shown in FIGS. 1 through 6 are for a suspension that is not equipped with an anti-sway bar.

Referring now to the first plate 10 shown in FIGS. 1 through 6, it is comprised of three main components which are welded together. Those components are: a longitudinally extending main plate member 51; a leading end plate 48; and a trailing end plate 50. Longitudinally extending plate member 51 includes four sections: an upper vertical plate section 52; a horizontal plate section 54; a lower vertical plate section 56; and a lower lip 58. The upper vertical plate section 52 and the lower vertical plate section 56 are in an off-set and generally parallel relationship. Extending from the outer face of the upper vertical plate section 52 are three pockets including a shock absorber pocket 38 formed by gusset plates 40 and a bearing plate 42, a jounce bumper pocket 61 formed by gusset plates 40 and 46 and jounce bumper plate 62, and a coil spring pocket 39, defined by the end plate 48, gusset plate 46 and coil spring bearing plate 47. A lifting lug 44 may be welded to the bearing plate 47 for use in lifting the complete vehicle. The lower vertical plate section 56 has an opening 70 so that a half-shaft 16 can extend from the differential 15 to the wheel end 18 (see FIG. 1).

Figure 2:
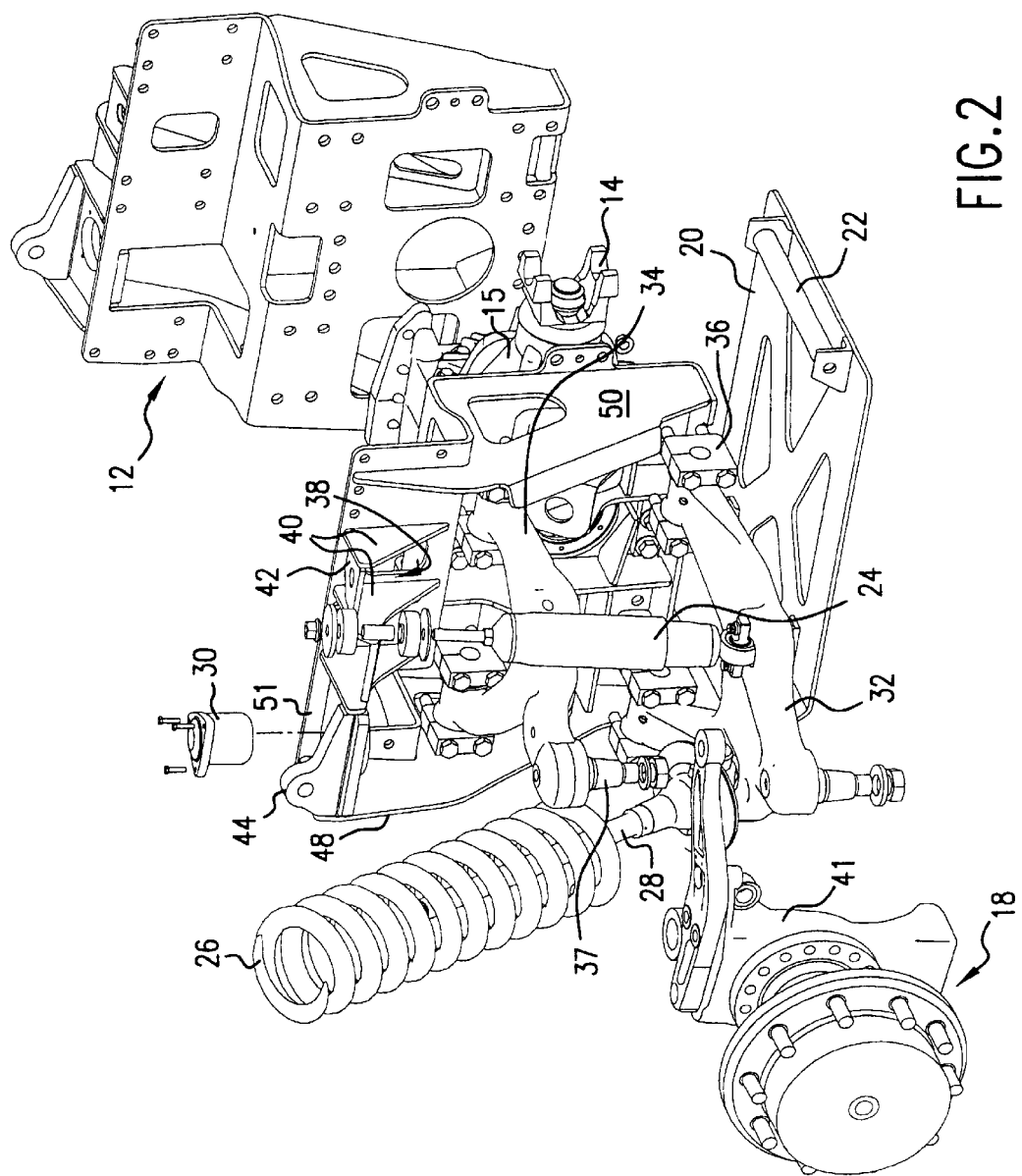
FIG. 2 is a second perspective view of the weldments shown in FIG. 1 with other suspension components shown adjacent thereto.

FIG. 2 illustrates elements of the suspension system disconnected from the first side plate 10 and partially exploded away from side plate 10. As evident from FIG. 2, upon assembly of the suspension system, the shock absorber 24 extends from the bearing plate 42 to the lower control arm 32. Similarly, upon assembly of the suspension system, the suspension coil spring 26 extends from the lower control arm. 32 to the bearing plate 47. In addition, inside the suspension coil spring 26, a spring guide 28 extends from the lower control arm 32 into the spring guide bushing 30 which is bolted to the coil spring bearing plate 47. An upper control arm 34 is connected by a ball joint 37 to an upper portion of the steering knuckle 41. The upper and lower control arms 34 and 32, respectively, are held in place by four control arm mounting assemblies 94, an example of which is more clearly shown in FIG. 10 discussed below. The locations of the control arm mounting assemblies for a left-hand side plate 10 can best be seen in FIG. 4 wherein upper control arm attachment locations 68 and lower control arm attachment locations 66 are at upper and lower portions of the vertical mounting plate 56. An ear 78 is used to support various system lines, i.e., hoses and wires, etc., which lead to the wheel end 18. A stiffening flange 60 extends from the outer edge of the end plate 50 to provide the plate 50 with increased resistance to buckling.

Figure 7:
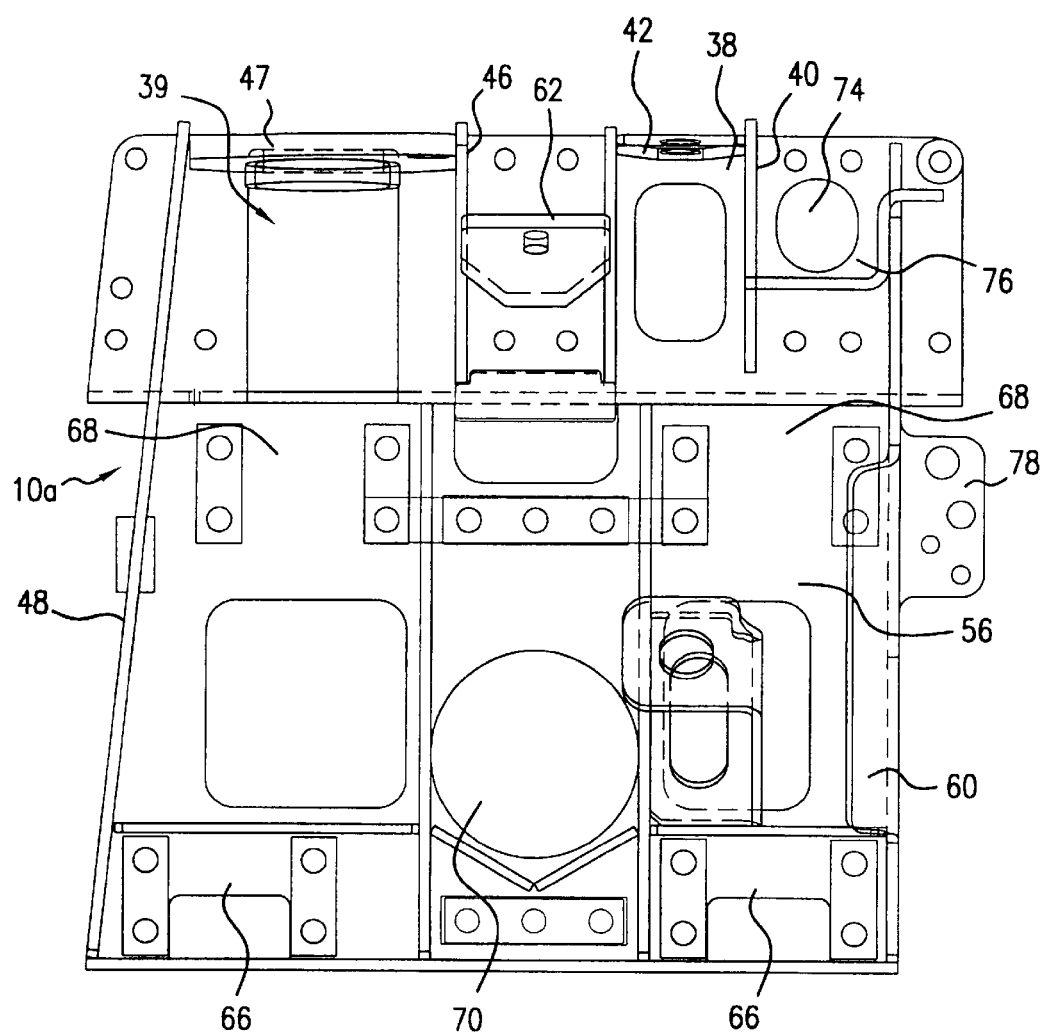
FIG. 7 is side-elevational view of a rear left-hand weldment of the present invention as configured for use with an anti-sway bar.
Figure 8:
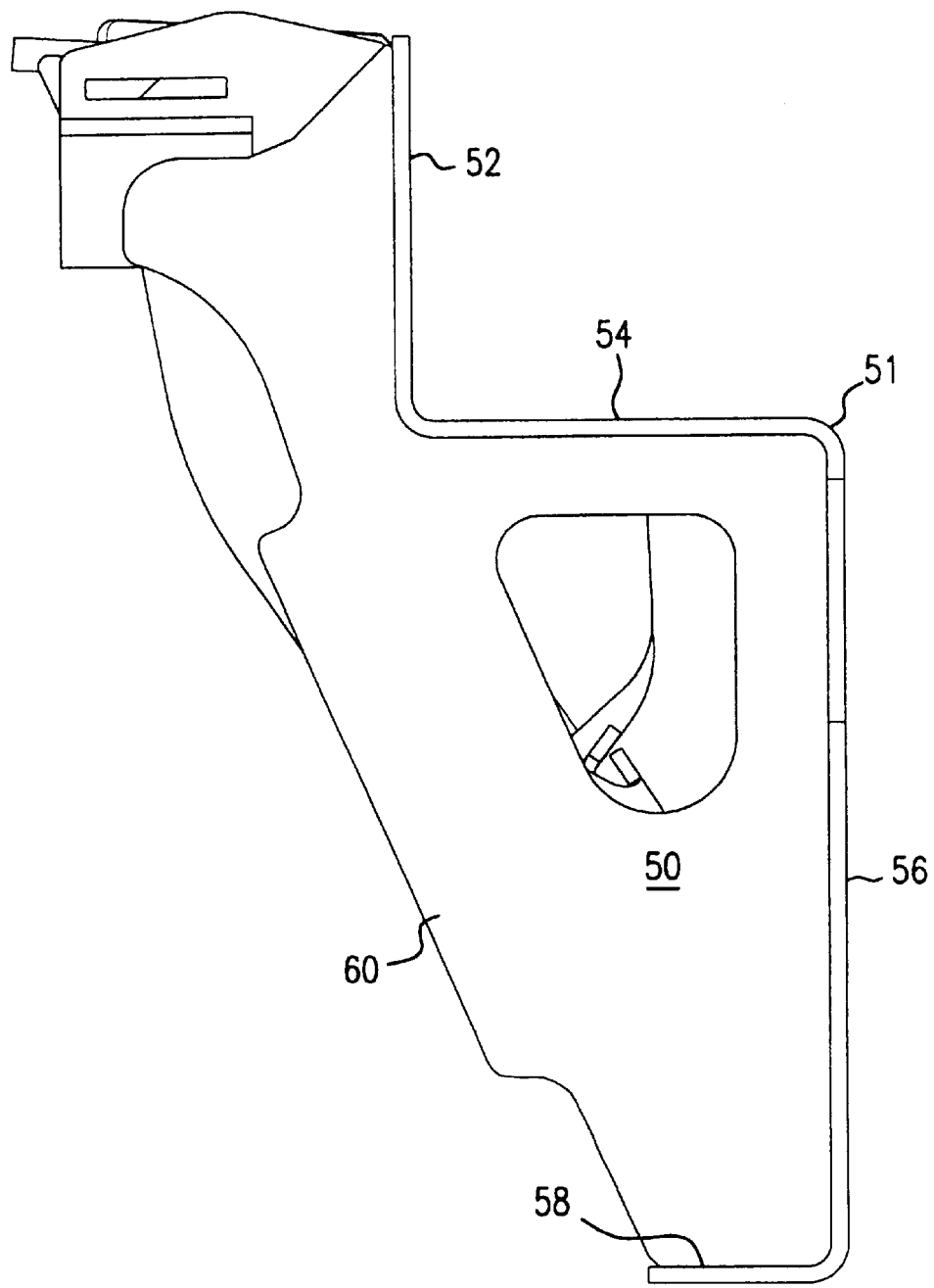
FIG. 8 is an end view of the weldment shown in FIG. 7.
Figure 9:
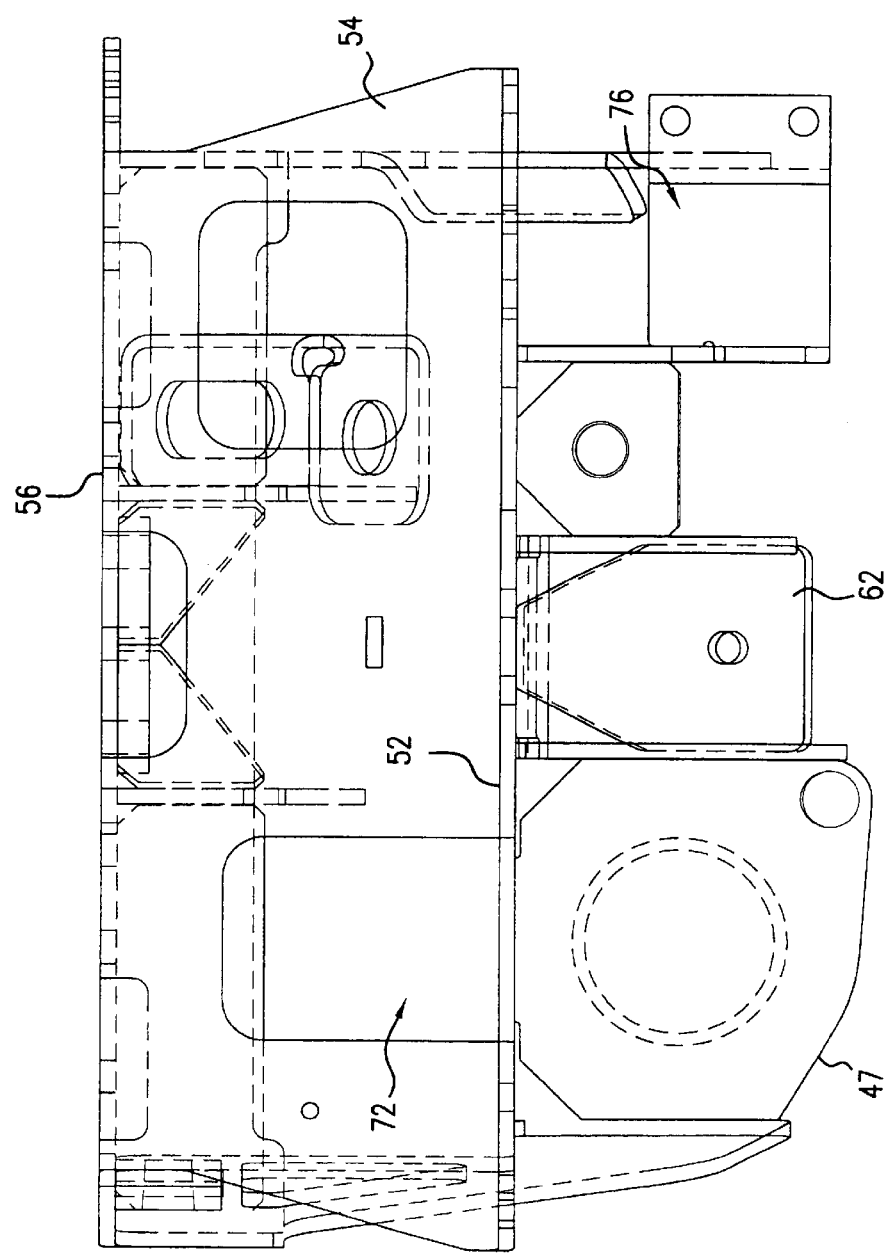
FIG. 9 is a top plan view of the weldment shown in FIGS. 7 and 8.
Figure 12:
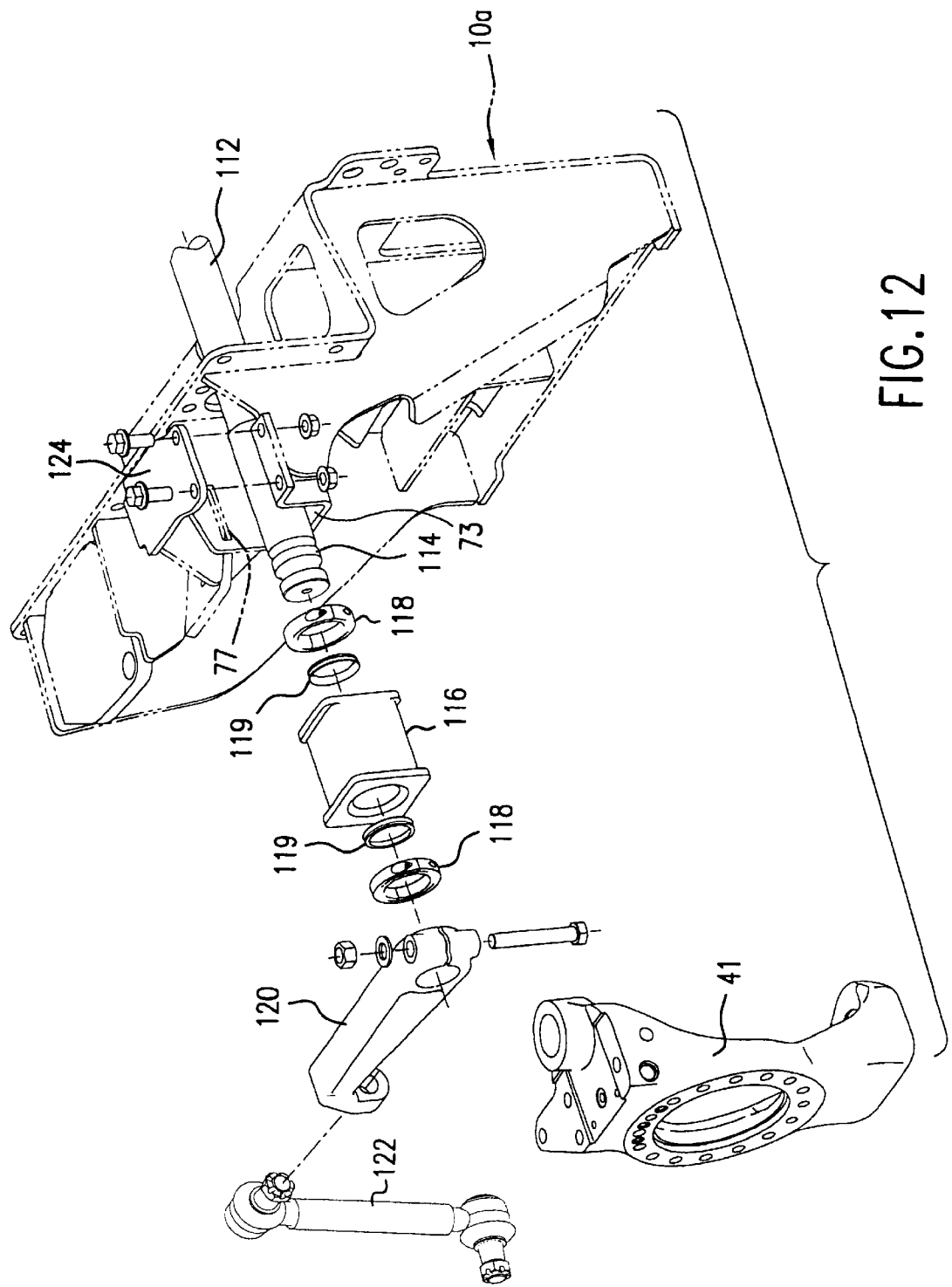
FIG. 12 is an exploded perspective view of an anti-sway bar assembly made in accordance with the present invention.

FIGS. 7, 8 and 9 show a left-hand side plate 10a for use with an anti-sway bar. In describing the anti-sway bar equipped left-hand side plate 10a, the same reference numerals used to indicate portions of the non anti-sway bar equipped side plate 10 are used for components which are the same. For example, a coil spring bearing plate 47 extends between an end plate 48 and a gusset 46 to define a pocket 38 for a coil spring. The left-hand side plate 10a includes upper control arm mounting locations 68 and lower control arm mounting locations 66. Gusset plates 40 and shock absorber bearing plate 42 define a shock absorber pocket 39. However, an element which is part of the left-hand side plate 10a, which is not included in the side plate 10 is a bushing pocket 76 and an opening 74 through which extends an anti-sway bar 112, more details of which are shown in FIG. 12.

Figure 10:
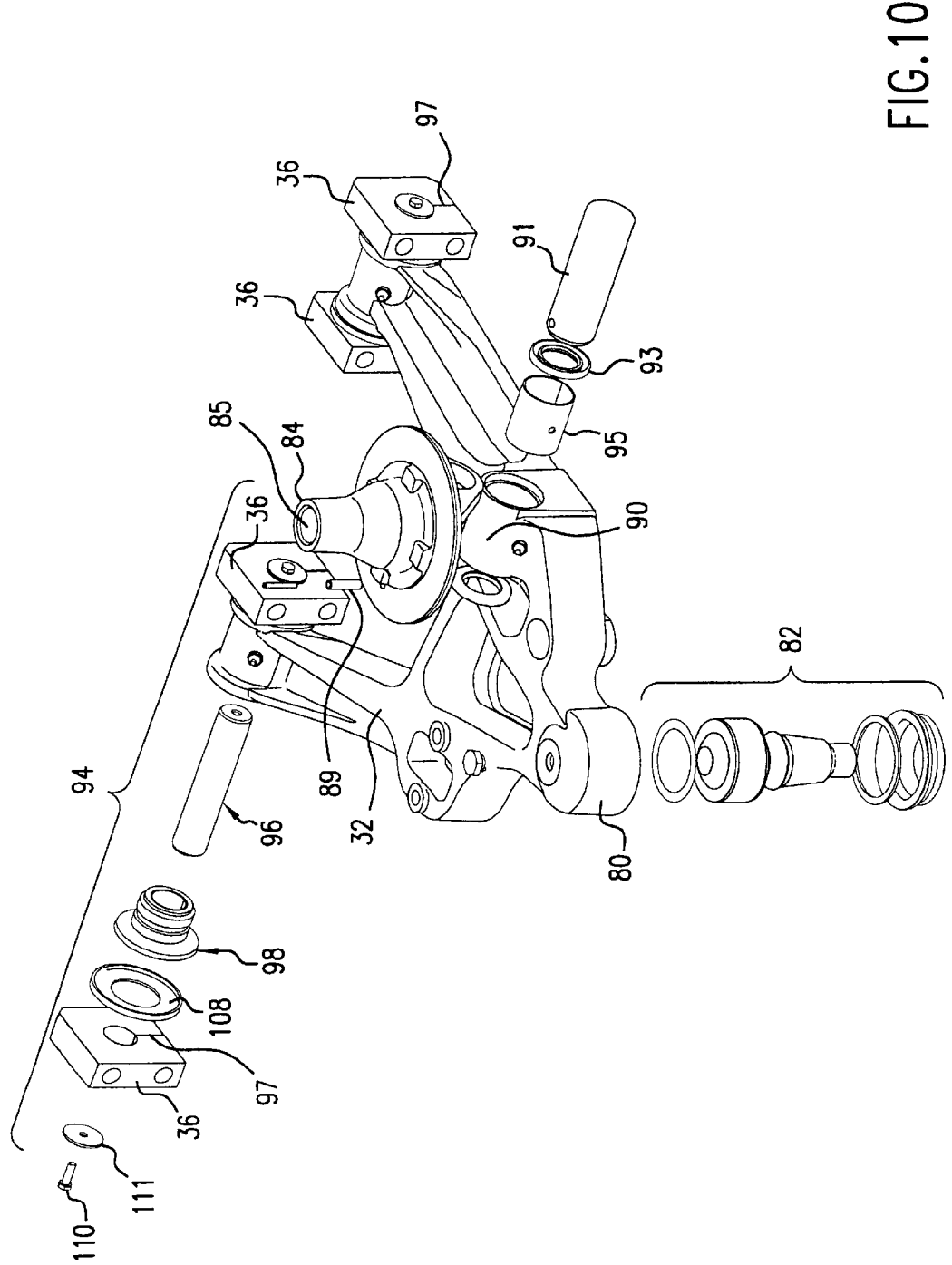
FIG. 10 is an exploded perspective view of a lower control arm constructed in accordance with the present invention.
Figure 11A:
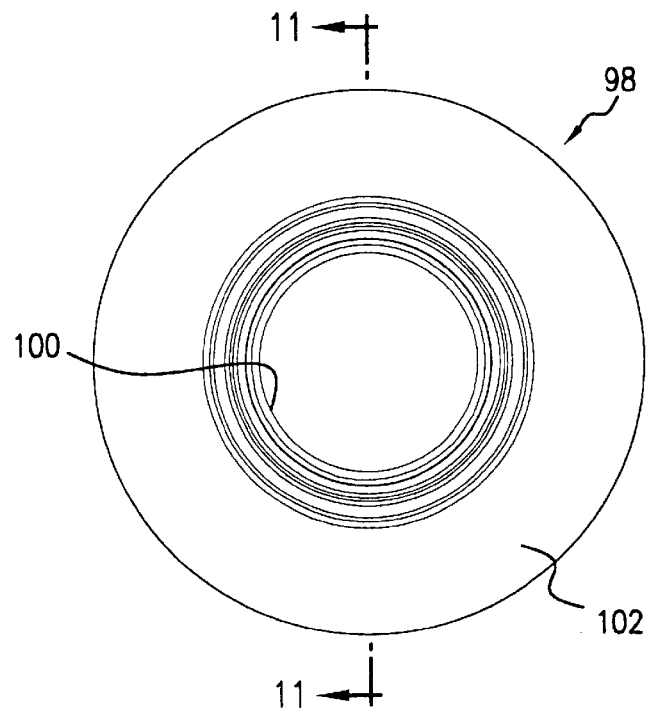
FIG. 11A is a top view of a bushing assembly of the control arm of the present invention.
Figure 11:
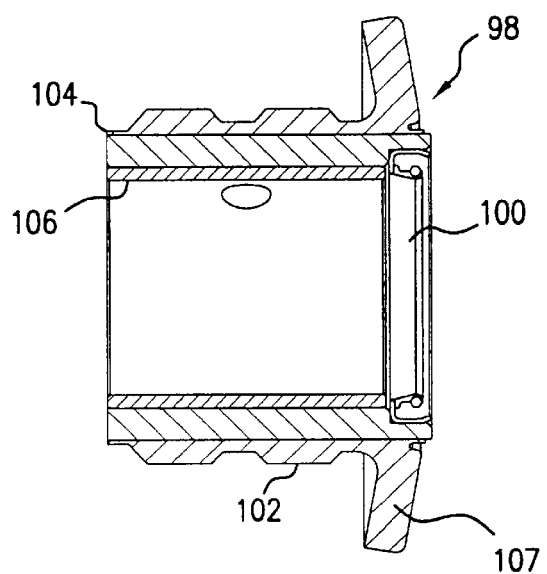
FIG. 11 is cross-sectional view of a bushing assembly of the control arm of the present invention.

FIG. 10 is an exploded view of a lower control arm assembly. The lower control arm 32 has two control arm mounting assemblies 94, one of which is shown in exploded form on the left side of FIG. 10. The control arm mounting assembly 94 includes a pin 96 and two bushing assemblies 98 (more detail of which is shown in FIG. 11). The ends of the pin 96 are clamped by the blocks 36 as the blocks 36 are attached to the lower vertical plate section 56 of a side plate. A thrust washer 108 is disposed between each bushing assembly 98 and a block 36. A screw 110 and washer 111 are used to properly pre-load the bushing assembly 98 before installation. The lower control arm 32 includes a spring mount 90 through which there extends a spring pivot pin 91 and a sleeve bearing 95. A spring seat 84 with a threaded hole 85 for receiving the spring guide 28 (See FIG. 15) straddles the spring mount 90. A small dowel pin 89 retains the pin in the spring seat 84, and causes the spring seat 84 to rotate the spring pivot pin 91 within the sleeve bearing 95.

A pair of seals 93 prevent contaminants from entering the sleeve bearing 95 within the spring mount 90. FIG. 10 also shows a ball joint assembly 82, which is disposed in a socket 80 on the outer end of the lower control arm 32.

FIG. 11 is an enlarged cross-sectional view of the bushing assembly 98 which is part of the control arm mounting assembly 94. The bushing assembly 98 includes an inner sleeve bearing 106, an intermediate metal sleeve 104 and an outer elastomeric sleeve 102 which has a flange 107 at one end and annular ribs and grooves on the outside surface thereof. A seal 100 engages a shoulder formed on the outer edge of the intermediate sleeve 104. The bushing assembly 98 fits snugly into a bore formed at the inside end of each leg of the lower control arm 32. As the block 36 is tightened into position against the lower vertical plate section 56 of an end plate, the pin 96 is gripped by the block 36 as a result of the closing of the gap formed by the slot 97 in the block 36. A slot in each block 36 of a control arm mounting assembly allows for easy removal of a pin 96 from the assembly 94. Arranging the slots 97 so that they face down makes is harder for water and mud to flow into the pin/block joint.

Figure 3:
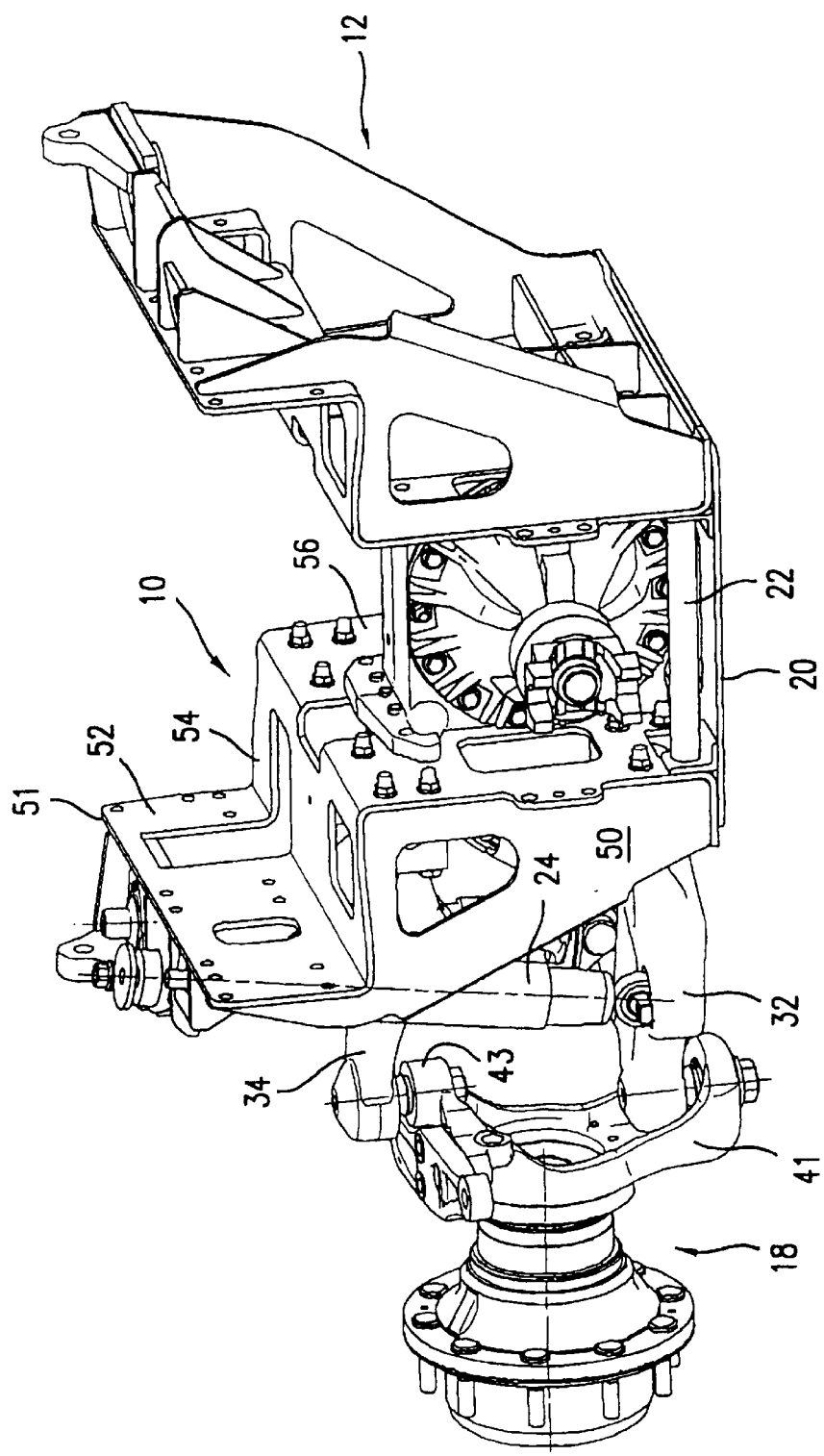
FIG. 3 is a third perspective view of the weldments shown in FIGS. 1 and 2.
Figure 4:
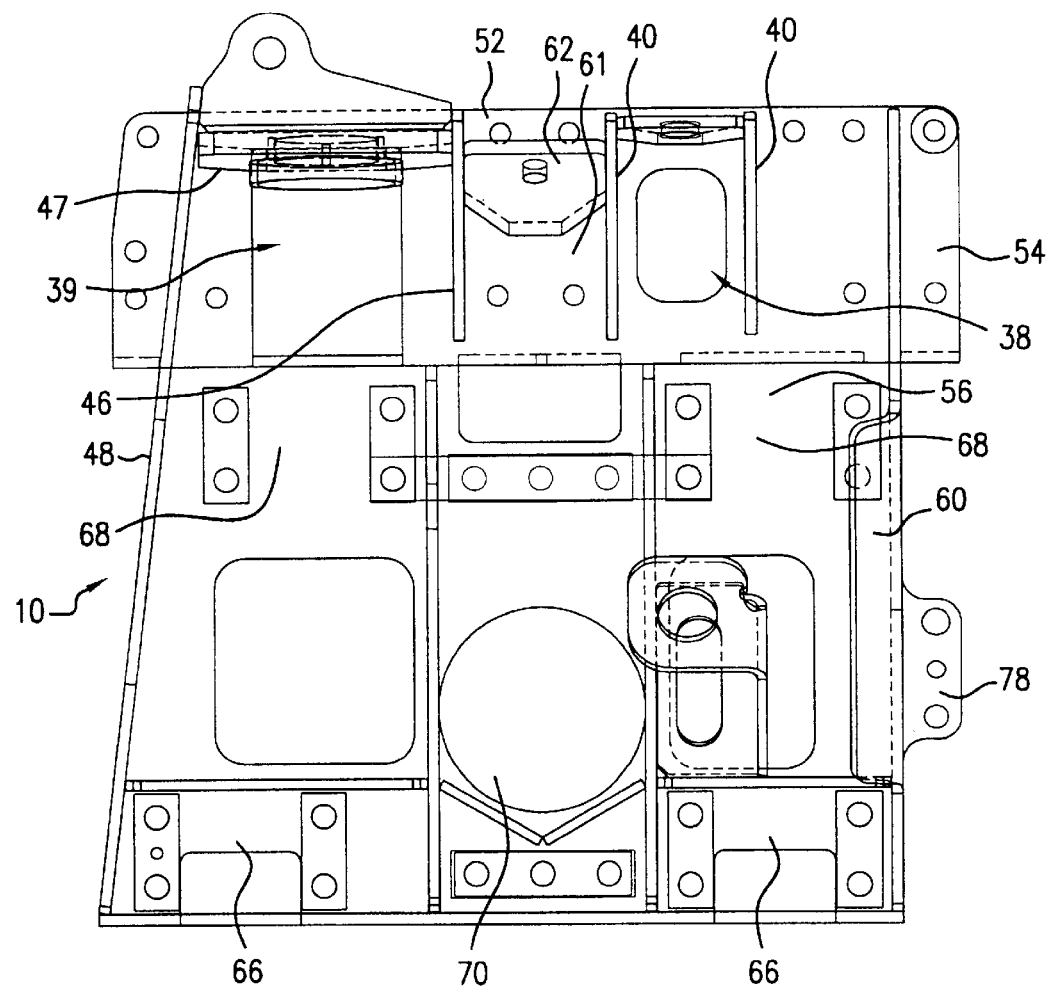
FIG. 4 is a side-elevational view of a front left-hand weldment of the present invention as configured with no anti-sway bar.
Figure 5:
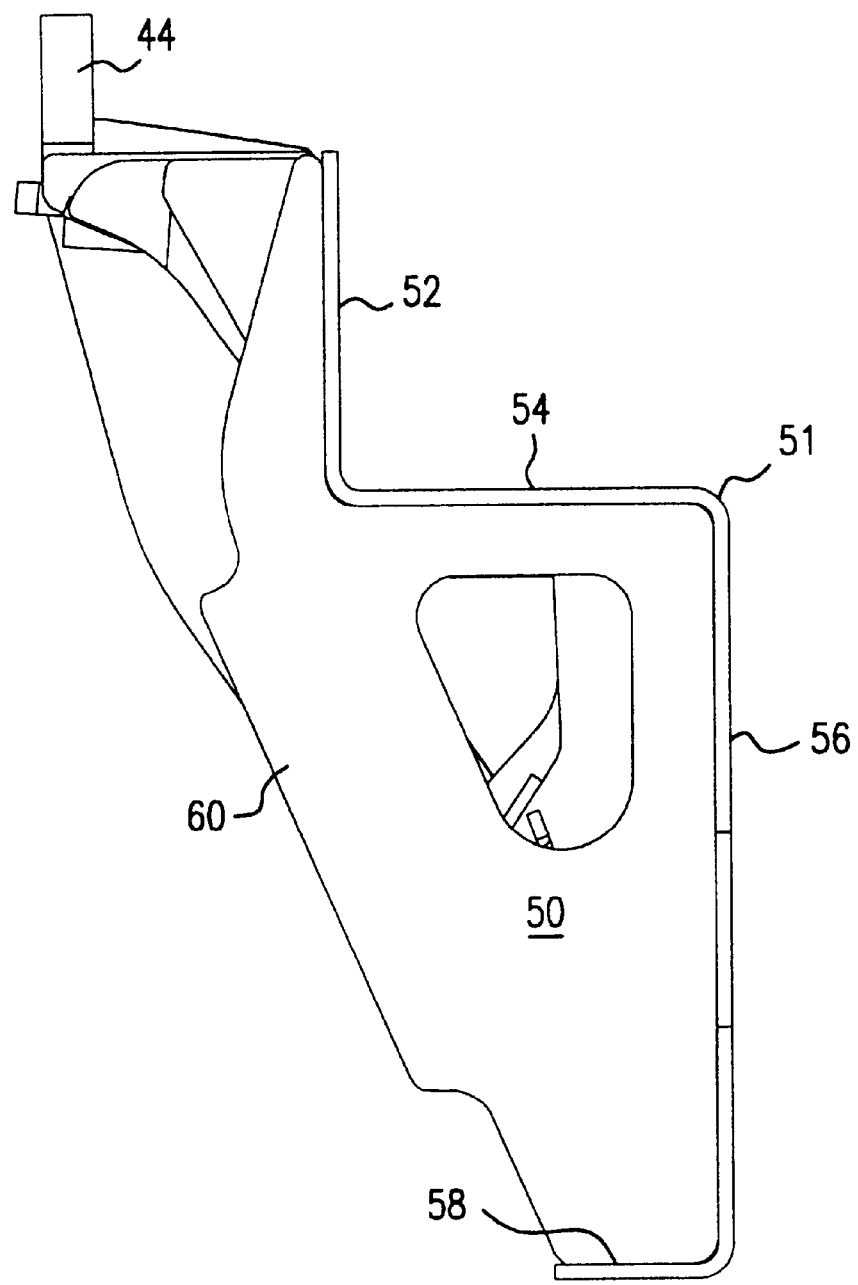
FIG. 5 is an end view of the weldment shown in FIG. 4.
Figure 6:
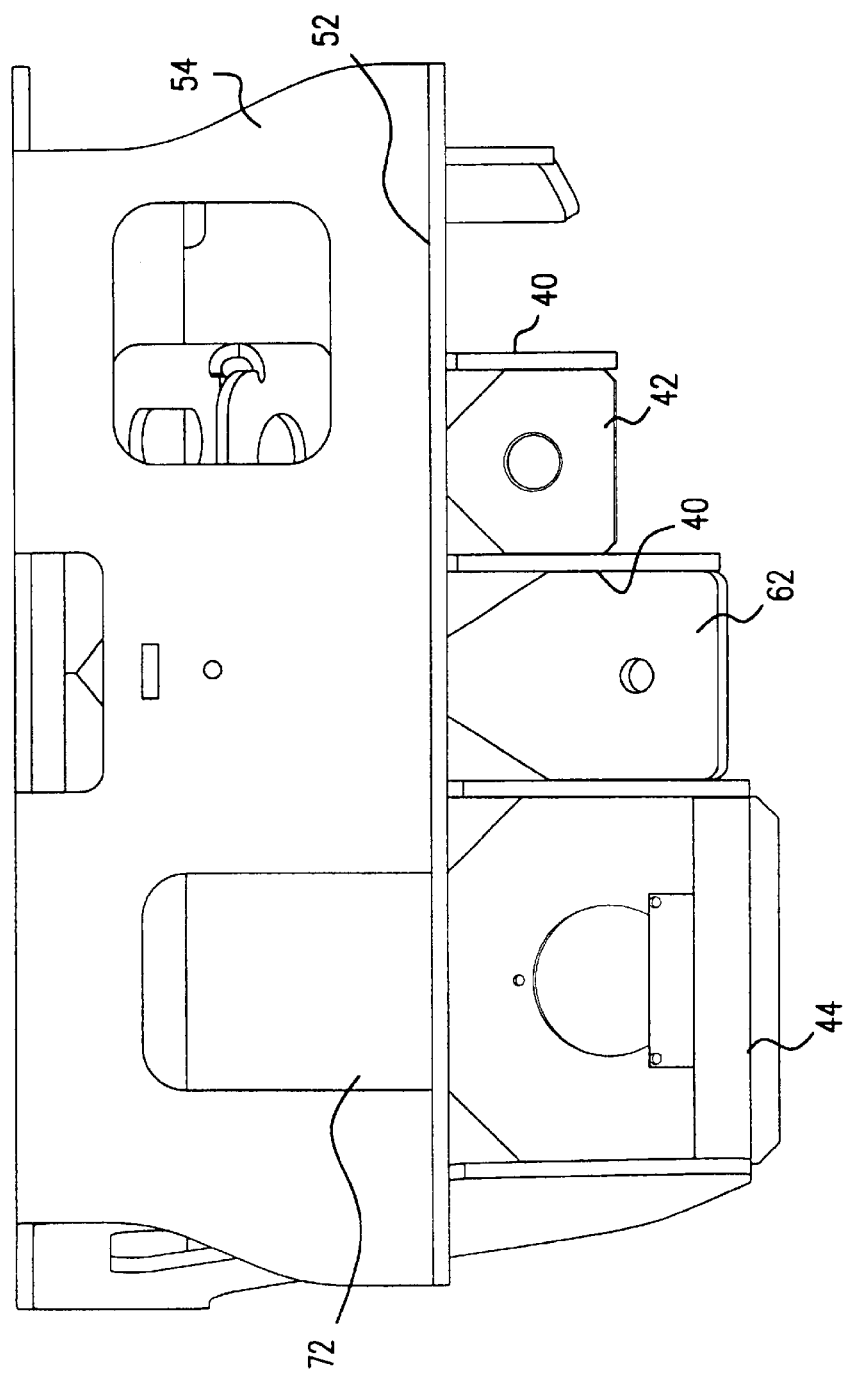
FIG. 6 is a top plan view of the weldment shown in FIGS. 4 and 5.

FIG. 12 shows the anti-sway assembly which forms a part of the present invention. An anti-sway bar 112 has a splined end 114 and extends through the opening 74 in the upper vertical plate section 52 of a side plate 10a. The anti-sway bar 112 is supported by a bushing 116. The bushing 116 is contained in a pocket 73, the top portion of which is formed by a removable plate 124. One other end of the plate 124 is inserted into a slot 77 formed in a gusset plate 40, and the other end of plate 124 is held in place by bolts. A pair of collars 118 maintain the position of the anti-sway bar 112 in the bushing 116. A pair of seals 119 prevent contaminants from entering the bushing 116. The splined end 114 of the anti-sway bar 112 is engaged in and clamped by an end of the arm 120. A vertical link 122 connects an end of the arm 120 to a lug 43 of the steering knuckle 41, as shown in FIG. 3.

Figure 13:
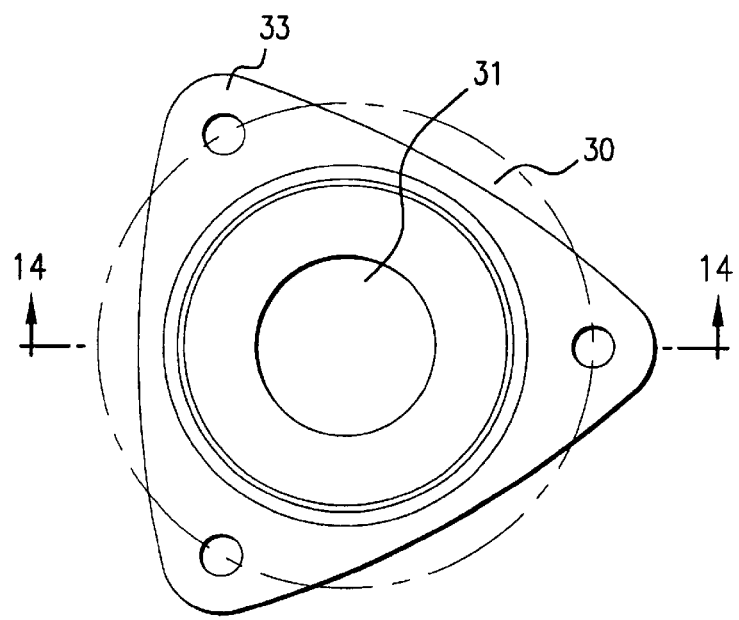
FIG. 13 is an end view of the spring guide bushing shown in FIG. 14 made in accordance with the present invention.
Figure 14:
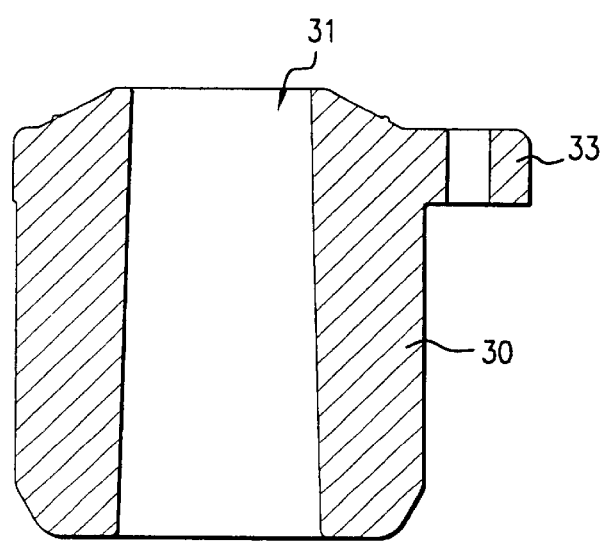
FIG. 14 is a cross-sectional view showing a bushing for a spring guide.

FIGS. 13 and 14 show the spring guide bushing 30 which is attached to the coil spring bearing plate 47 on the front side plates 10 and 12. The spring guide bushing 30 includes a tapered bore through which a spring guide 28 extends. The taper allows the spring guide 28 to articulate slightly within the bushing 30. The bushing 30 is preferably made of a durable elastomeric polymer, such as molybdenum disulphide, nylon 6 filled material having a Rockwell hardness of about B120, when measured at 73° F. Three mounting ears 33 facilitate the connection of the bushing 30 to the bearing plate 47. The bushing 30 is mounted in the orientation shown in FIG. 2 so that the narrower end of the tapered opening 31 is upward, i.e., the bushing 30 extends down into and through the opening in the bearing plate 47. The rear spring is stable enough by itself not to need a guide. The spring guide 28 is shown in FIG. 15. The tubular spring guide 28 is preferably polished on at least the upper 12 inches, and is preferably ferritic nitro-carburized over the entire surface of the spring guide with oxide. The spring guide 28 has a threaded end 27 which threads into the threaded hole 85 in the spring seat 84. (See FIG. 10.) A stop 35 is welded to the body of the spring guide 28 to limit the threaded engagement of the, threaded end 27 and the spring seat 84. At the opposite end of the spring guide 28 a drive socket is incorporated to facilitate the threaded engagement of the spring guide 28 into the spring seat 84 with a common wrench. It should be noted that the diameter of the spring guide 28 is substantially smaller than the inside diameter of the coil spring 26 through which it extends. The result is a non-contact spring guide. The spring guide 28 is free to slide within the tapered opening 31 in the spring guide bushing 30 as the wheel of a vehicle moves up and down. The alignment of the spring seat 84, however, is maintained so that buckling of the coil spring 26 is prevented, even in instances where there is a large compression of the spring as a result of relative movement of the wheel and the frame.

Having described a number of features, discoveries and principals embodied in the foregoing examples, it is intended and will be understood by those skilled in the art, that a number of modifications, alternatives and variations thereof may be made while still incorporating the spirit and scope of the inventions as claimed below.

What is claimed:

1. A vehicle independent suspension assembly comprising a first control arm configured to be pivotally coupled to a frame, a second control arm pivotally coupled to the frame above the first control arm, a pivotable spring seat rotatably mounted to said first control arm, a coil spring bearing plate carried by a vehicle frame above the second control arm, a coil spring extending from the spring seat on the first control arm past the second control arm to the bearing plate, wherein said spring is normally partially compressed by weight of a vehicle between said coil spring bearing plate and said spring seat on said first control arm, a bumper external to the spring and configured to limit upward pivoting of at least one of the first control arm and the second control arm, an elongated member having a first end portion rigidly mounted to said spring seat, a middle portion extending axially within said coil spring to said bearing plate, and a second end portion extending through an opening in the bearing plate so as to slide relative to the bearing plate, wherein the first end portion, the middle portion and the second end portion of the elongate member are rigidly fixed relative to one another.

2. A vehicle suspension assembly in accordance with claim 1 wherein:
    a bushing is disposed adjacent to said opening,
    said bushing having a central through-hole aligned with said opening and having mounting flanges at one end mounted to one side of said bearing plate,
    said through-hole being tapered with one end of said through-hole being larger in diameter than said elongated member, and an opposite end of said through-hole having a diameter smaller than said elongated member,
    said bushing being comprised of wear-resistant material, whereby said bushing guides said elongated member as said elongated member passes through said bushing.

3. A vehicle suspension assembly in accordance with claim 2 wherein:
    said elongated member is cylindrical and has an externally threaded first end and wrench engagement surfaces at a second end,
    said spring seat having a threaded hole, whereby said elongated member may be installed by passing said elongated member through said bushing and using said wrench engagement surfaces to thread said externally threaded end into rigid supporting engagement with said internally threaded hole in said spring seat.

4. A vehicle suspension assembly in accordance with claim 3 wherein:
    said elongated member is a hollow tube with internal driving surfaces at one end whereby said tube may be tightened into said internally threaded hole by application of rotative forces to said driving surface.

5. A vehicle suspension assembly in accordance with claim 4 wherein:
    said tube is smooth on an upper portion of said tube and said bushing is made of a wear-resistant polymeric.

6. A vehicle suspension assembly in accordance with claim 1 wherein:
    said coil spring has an inside diameter and said elongated member has an outside diameter, said inside diameter of said coil spring being substantially greater than said outside diameter of said elongated member.

7. A vehicle suspension assembly in accordance with claim 1, wherein the first end portion, the middle portion and the second end portion are integrally formed as part of a single unitary body.

8. A vehicle suspension assembly in accordance with claim 1, wherein the elongated member linearly extends from the spring seat to the bearing plate.

9. A vehicle suspension assembly in accordance with claim 1 including a shock absorber coupled between the vehicle frame and the first control arm.

10. A vehicle suspension assembly in accordance with claim 9, wherein a portion of at least one of the first control arm and the second control arm extends between the shock absorber and the elongated member.

11. The vehicle suspension of claim 1, wherein the first control arm is configured to be pivotally coupled to a frame about an axis substantially parallel to the frame.

12. The vehicle suspension of claim 1, wherein the spring seat is rotatably mounted to the first control arm about an axis parallel to the frame.

13. A vehicle suspension assembly comprising a control arm, a coil spring, a pivotable spring seat rotatably mounted to said control arm, a coil spring bearing plate carried by a vehicle frame, said spring being normally partially compressed by weight of a vehicle between said coil spring bearing plate and said spring seat on said control arm, an elongated member rigidly mounted to said spring seat and extending axially within said coil spring to said bearing plate, said bearing plate having said elongated member extending through and being guided by an opening, said elongated member being slidable within a bushing carried by said bearing plate;
    said bushing is disposed adjacent to said opening;
    said bushing having a central through-hole aligned with said opening and having mounting flanges at one end mounted to one side of said bearing plate;
    said through-hole being tapered with one end of said through-hole being larger in diameter than said elongated member, and an opposite end of said through-hole having a diameter smaller than said elongated member, and
    said bushing being comprised of wear-resistant material, whereby said bushing guides said elongated member as said elongated member passes through said bushing.

14. A vehicle suspension assembly in accordance with claim 13 wherein:
    said elongated member is cylindrical and has an externally threaded first end and wrench engagement surfaces at a second end,
    said spring seat having a threaded hole, whereby said elongated member may be installed by passing said elongated member through said bushing and using said wrench engagement surfaces to thread said externally threaded end into rigid supporting engagement with said internally threaded hole in said spring seat.

15. A vehicle suspension assembly in accordance with claim 14 wherein:
    said elongated member is a hollow tube with internal driving surfaces at one end whereby said tube may be tightened into said internally threaded hold by application of rotative forces to said driving surface.

16. A vehicle suspension assembly in accordance with claim 15 wherein:

said tube is smooth on an upper portion of said tube and said bushing is made of a wear-resistant polymeric.

17. A vehicle suspension comprising:

a frame;

a first control arm pivotally coupled to the frame about an axis substantially parallel to the frame;

a coil spring captured between the frame and the first control arm;

a bumper external to the spring and configured to limit upward pivoting of the first control arm; and an elongated member having a first end portion coupled to one of the first control arm and the frame, a middle portion passing through the coil spring and a second end portion slidably coupled to the other of the first control arm and the frame, wherein the first end portion, the middle portion and the second end portion are axially fixed relative to one another.

18. The suspension of claim 17, wherein the second end portion is slidably coupled to the frame.

19. The vehicle suspension of claim 18, wherein the second end portion slidably passes through the frame.

20. The vehicle suspension of claim 19 including a bushing coupled to the frame, wherein the second end portion slidably extends through the bushing.

21. The vehicle suspension of claim 17, wherein the first end portion is pivotally coupled to the said one of the first control arm and the frame.

22. A vehicle suspension assembly in accordance with claim 17, wherein the first end portion, the middle portion and the second end portion are integrally formed as part of a single unitary body.

23. A vehicle suspension assembly in accordance with claim 17 including a shock absorber coupled between the vehicle frame and the first control arm.

24. The vehicle suspension of claim 23 including a wheel end drive shaft extending between the coil spring and the shock absorber.

25. A vehicle suspension assembly in accordance with claim 17, wherein the elongated member linearly extends between the first control arm and the frame.

26. A vehicle suspension assembly in accordance with claim 17 including a second control arm pivotally coupled to the frame above the first control arm.

27. A vehicle suspension assembly in accordance with claim 26 including a shock absorber coupled between the vehicle frame and the first control arm.

28. A vehicle suspension assembly in accordance with claim 27, wherein a portion of at least one of the first control arm and the second control arm extends between the shock absorber and the elongate member.

* * * * *